United States Patent [19]

Blair

[11] 4,432,606

[45] Feb. 21, 1984

[54] OPTICAL FIBER INSENSITIVE TO TEMPERATURE VARIATIONS

[75] Inventor: G. Richard Blair, Culver City, Calif.

[73] Assignee: Hughes Aircraft Company, El Segundo, Calif.

[21] Appl. No.: 305,309

[22] Filed: Sep. 24, 1981

[51] Int. Cl.³ .................................... G02B 5/172
[52] U.S. Cl. ............................ 350/96.33; 65/3.3; 65/117
[58] Field of Search .............. 350/96.29, 96.30, 96.31, 350/96.33, 96.34; 65/3.3, 104, 117

[56] References Cited

U.S. PATENT DOCUMENTS 2,880,552  4/1959  Whitehurst ........................... 65/3.3
3,019,515  2/1962  Whitehurst et al. ......... 350/96.33 X
3,395,994  8/1968  Cuff ................................... 65/117 X

FOREIGN PATENT DOCUMENTS 56-43606  4/1981  Japan .............................. 350/96.34

OTHER PUBLICATIONS

Pinnow et al., "Hermetically Sealed High Strength Fiber Optical Waveguides", *Trans. of IECE of Japan*, vol. E61, No. 3, Mar. 1978, pp. 171–173.

Pinnow et al., "Reductions in Static Fatigue of Silica Fibers by Hermetic . . . ", *Appl. Phys. Lett.*, vol. 34, No. 1, Jan. 1979, p. 17–19.

*Primary Examiner*—John D. Lee
*Attorney, Agent, or Firm*—David W. Collins; William J. Bethurum; Anthony W. Karambelas

[57] ABSTRACT

Metal-coated optical fibers are often employed in high temperature optical communications applications. However, such optical fibers have been found to evidence a substantial decrease in optical transmission as a function of increased temperature. Optical fibers having a temperature-insensitive optical transmission are obtained by annealing a metal-coated optical fiber at a temperature at which optical transmission is substantially the same as that observed at room temperature. Aluminum-coated optical fibers annealed at 560° C. evidence an optical transmission independent of temperature between about −200° C. and at least about 560° C.

11 Claims, 2 Drawing Figures

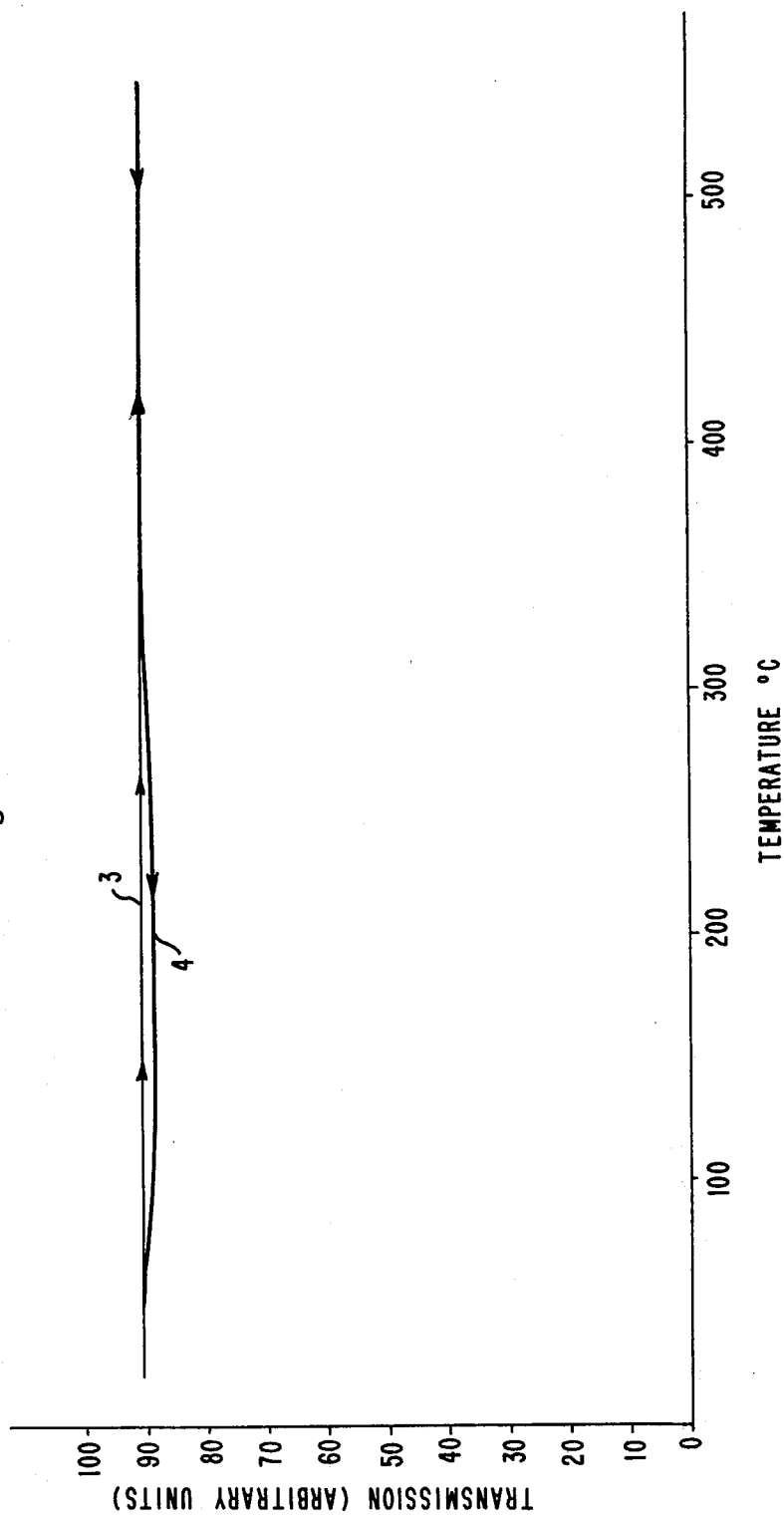

OPTICAL FIBER INSENSITIVE TO TEMPERATURE VARIATIONS

The Government has rights in this invention pursuant to Contract No. DAAG 29-80-C-0139 awarded by the Department of the Army.

BACKGROUND OF THE INVENTION

1. Field of the Invention

This invention relates to optical fibers of the type commonly used for transmitting information by optical signals, and more particularly, to improving transmission in such fibers.

2. Description of the Prior Art

Optical fibers comprising at least a light-conducting core and a glass optical cladding thereon are generally coated with plastic materials in order to protect them against the detrimental effects of water vapor, which lead to stress corrosion cracking. However, plastic materials tend to limit the operation of optical fibers between about $-50°$ C. and $+150°$ C. The lower temperature boundary is dictated by considerations of flexibility; organic coatings tend to become brittle at lower temperatures. The upper temperature boundary is dictated by considerations of temperature stability; organic coatings tend to decompose at higher temperatures.

The use of metal coatings has enabled optical fibers to be employed in temperature applications which are limited only by the melting point of the metal coating. However, it has been observed that metallic-clad optical fibers show a substantial decrease in optical transmission as a function of increased temperature. Such transmission variations of optical transmission are, of course, unacceptable for optical fibers employed at elevated temperatures. As used herein, optical transmission includes at least the wavelength range from about 0.41 to 0.85 $\mu$m.

SUMMARY OF THE INVENTION

In accordance with the invention, metal-coated optical fibers evidencing a loss in optical transmission as a function of temperature are annealed by heating the fibers to at least a temperature at which transmission is substantially the same as that observed at room temperature, such temperature being higher than the temperature range over which the metal-clad optical fiber exhibits a loss in optical transmission. The annealing process results in an optical fiber having a optical transmission which is substantially independent of temperature up to close to the melting point of the metal coating.

DETAILED DESCRIPTION OF THE INVENTION

Figure 1:
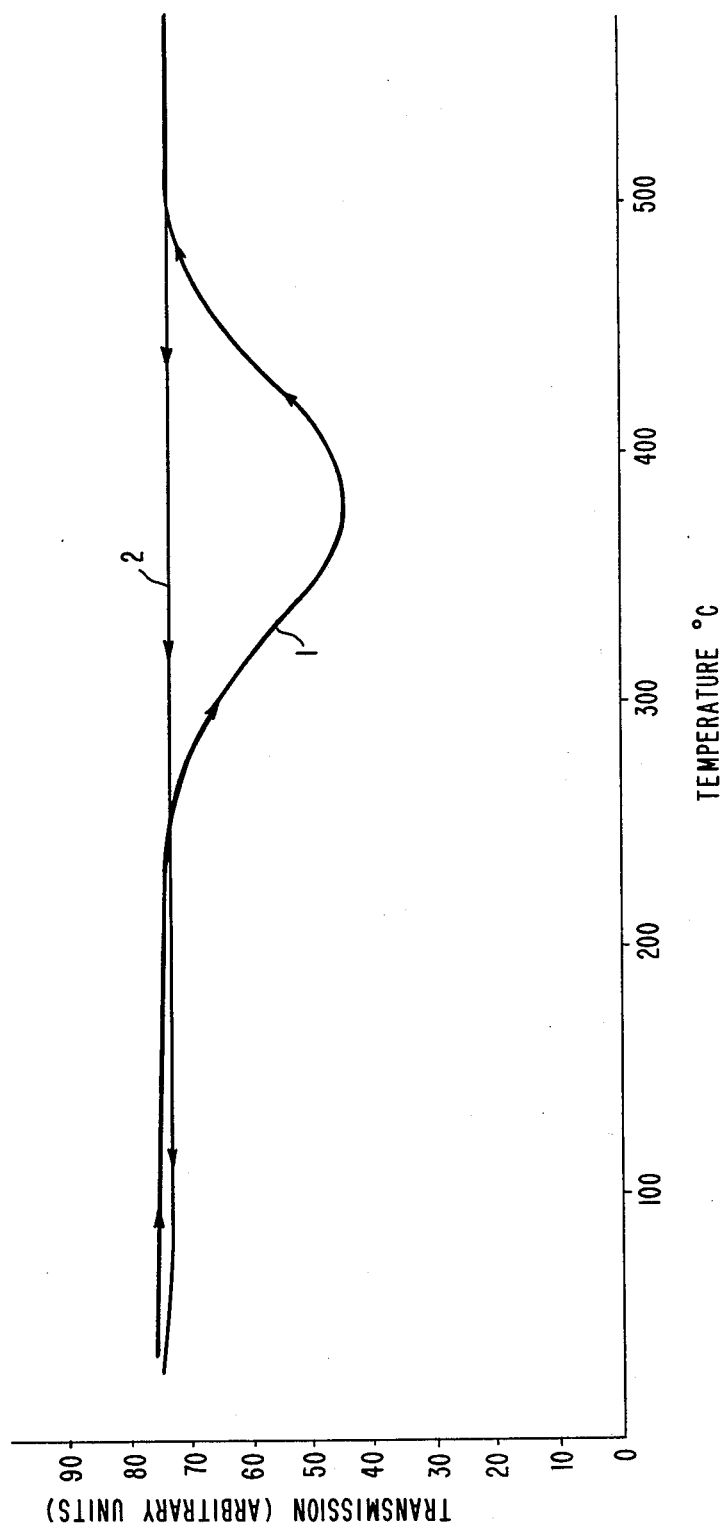
FIG. 1, on coordinates of transmission and temperature, depicts the optical transmission behavior of a fiber heated from room temperature to 560° C., and FIG. 2, also on coordinates of transmission and temperature, depicts the optical transmission behavior of an optical fiber annealed in accordance with the invention.

The optical fibers beneficially processed in accordance with the invention typically comprise a core of about 50 $\mu$m in diameter, primarily of silica, with other additives such as boron oxide ($B_2O_3$), germanium dioxide ($GeO_2$), phosphorus pentoxide ($P_2O_5$) and the like, with a cladding of vitreous $SiO_2$ about 35 $\mu$m in thickness. As is conventional, a barrier of about 1 to 2 $\mu$m of a borosilicate glass is generally provided between the core and the cladding. The optical fibers are drawn from precursor rods, employing processes conventional in the art of fabricating optical fibers.

The optical fibers additionally include a metal coating about 12 to 30 $\mu$m in thickness. The composition of the metal coating may be any metal or alloy, such as aluminum, copper, nickel, and the like. The metal or alloy is advantageously applied to the fiber as it emerges from a drawing furnace by passing the fiber through a pool of molten metal. The particular composition of the metal coating and the process of applying it to the optical fiber form no part of this invention.

FIG. 1 depicts the effects of heating (Curve 1) on optical transmission (at a wavelength of 0.82 $\mu$m) of an aluminum-clad optical fiber up to about 560° C. As can be seen, there is a substantial decrease in optical transmission, beginning at about 225° C., which reaches a maximum at about 350° C. The optical transmission returns to approximately the observed room temperature value at about 500° C.

In accordance with the invention, this temperature variation of transmission is removed by heating the metal-coated optical fiber to at least about 500° C. Below this temperature, there is little beneficial effect, and hysteresis of optical transmission as a function of temperature is still observed. Above this temperature, the optical transmission remains at substantially the room temperature value as the optical fiber is cooled (Curve 2).

FIG. 2 depicts the temperature response of transmission (at 0.82 $\mu$m) for a metal-coated optical fiber annealed at 560° C. As can be seen, there is substantially no temperature variation of transmission from 25° C. to over 500° C. upon heating (Curve 3) or cooling (Curve 4).

The metal-coated optical fiber may, of course, be heated to a temperature greater than about 500° C. The upper limit is dictated by the melting point of the metal coating and thus should be at least a few degrees below the melting point.

The time of heating is apparently not critical. It is merely sufficient to heat the fiber to at least the minimum temperature and then cool. The cooling rate is also apparently not critical; cooling is conveniently achieved by shutting off the furnace and permitting the fiber to thereby cool to some lower temperature before removal.

The optical transmission of aluminum-clad optical fibers heat-treated in accordance with the invention is also independent of temperature from about $-200°$ C. to room temperature. The process of the invention thus provides an optical fiber evidencing temperature independence of optical transmission from about $-200°$ C. to at least about 560° C.

EXAMPLES

Example 1

An aluminum-coated optical fiber was prepared. The optical fiber comprised a core 50 $\mu$m in diameter of 69.6 mole % $SiO_2$, 29.9 mole % $GeO_2$ and 0.5 mole % $P_2O_5$ and a cladding 35 $\mu$m thick of $SiO_2$. The thickness of the aluminum coating was 25 $\mu$m. The optical fiber, which evidenced an optical transmission (at 0.82 $\mu$m) of 90.5 (arbitrary units) at room temperature, was heated to 410° C. and cooled. The optical transmission decreased to a value of 55.5 at 410° C. and recovered to 77.5 at 41° C. The optical fiber was then heated to 560° C. The optical transmission was similar to that depicted by Curve 1 of FIG. 1; by 500° C., it had increased to 86. At 560° C., the optical transmission was 89.5. Upon cooling to 150° C., the optical transmission dropped only slightly to 87. Subsequent heating and cooling should show no substantial temperature dependence of optical transmission, similar to that behavior depicted in FIG. 2.

EXAMPLE 2

An aluminum-coated optical fiber, substantially identical in dimensions and composition to the optical fiber of Example 1 and evidencing an optical transmission (at 0.82 $\mu$m) of 90.5 (arbitrary units) at room temperature, was heated to 275° C., where the optical transmission was 82. The optical fiber was held at 264° C. for 40 hrs to determine whether a long term heat soak at the edge of the optical transmission dip could be as effective as heating the optical fiber to about 550° C. After 40 hrs, the optical transmission decreased to 39; upon cooling, it increased to 54.5 at 33° C. The fiber was then heated to 550° C. The optical transmission was observed to decrease to 34 at 320° C., then gradually increase to 86.5 at 500° C. and 89 at 550° C. Upon cooling, the optical transmission remained substantially constant, and evidenced a value of 89.5 at 55° C. Subsequent heating and cooling showed no substantial temperature dependence of transmission.

EXAMPLE 3

An aluminum-coated optical fiber, substantially identical in dimensions and composition to the optical fiber of Example 1, was heat-treated in accordance with the invention to 550° C. and cooled to room temperature. The optical fiber, which evidenced an optical transmission of 75.5, was then heated to 550° C. and cooled to room temperature. There was substantially no change in optical transmission as a function of temperature.

The fiber was then placed in liquid nitrogen (−196° C.). The optical transmission was monitored continuously, and again, evidenced no change as a function of temperature.

What is claimed is:

1. A process for treating a metal-coated optical fiber comprising at least a light-conducting core and a glass optical cladding thereon which exhibits a loss in optical transmission as a function of temperature over a temperature range, characterized in that the optical fiber is heated to at least a temperature at which the transmission is substantially the same as that observed at room temperature, such temperature being higher than the temperature range over which the metal-coated optical fiber exhibits a loss in optical transmission.

2. The process of claim 1 in which the metal comprises aluminum.

3. The process of claim 2 in which the temperature of heating is at least about 500° C.

4. The process of claim 1 in which the temperature is no greater than a temperature just below the melting point of the metal coating.

5. Product produced by the process of claim 1.

6. An annealed, metal-coated optical fiber comprising at least a light-conducting core and a glass optical cladding thereon, evidencing substantially temperature-insensitive optical transmission.

7. The optical fiber of claim 6 in which the annealing temperature utilized to produce the temperature-insensitive optical transmission is higher than the temperature range over which the non-annealed metal-coated optical fiber exhibits a loss in optical transmission.

8. The optical fiber of claim 6 in which the annealing temperature is no greater than a temperature just below the melting point of the metal.

9. The optical fiber of claim 6 in which the metal comprises aluminum.

10. The optical fiber of claim 9 in which the annealing temperature is at least about 500° C.

11. The optical fiber of claim 10 in which the optical transmission is substantially constant from about −200° C. to at least about 560° C.

* * * * *